United States Patent
Leuck et al.

[11] Patent Number: 6,064,665
[45] Date of Patent: May 16, 2000

[54] SYSTEM AND METHOD FOR SINGLE TO TWO-BAND PERSONAL COMMUNICATION SERVICE BASE STATION CONVERSION

[75] Inventors: Wayne A. Leuck, Broomfield; Charles G. Gilbert, Westminster, both of Colo.; Ruvin I. Lerman, Eagle River, Ak.

[73] Assignees: U S West, Inc., Denver; MediaOne Group, Inc., Englewood, both of Colo.

[21] Appl. No.: 08/955,546

[22] Filed: Oct. 22, 1997

[51] Int. Cl.⁷ .................................... H04B 7/216
[52] U.S. Cl. ............................. 370/335; 370/481
[58] Field of Search ................... 370/200, 318, 370/320, 335, 334, 342, 343, 355, 375, 465, 481, 482, 486, 487, 491, 496; 375/200, 206, 260, 347; 455/45, 102, 118, 131, 150, 205, 207, 208, 209, 230, 255, 258, 303, 304, 313, 314, 315, 318, 323

[56] References Cited

U.S. PATENT DOCUMENTS

| | | | |
|---|---|---|---|
| 4,998,261 | 3/1991 | Van Driest et al. | 375/1 |
| 5,077,731 | 12/1991 | Omiya | 370/30 |
| 5,280,636 | 1/1994 | Kelley et al. | 455/131 |
| 5,339,330 | 8/1994 | Mallinckrodt | 375/1 |
| 5,457,734 | 10/1995 | Eryaman et al. | 379/58 |
| 5,493,695 | 2/1996 | Aitkenhead et al. | 455/54.1 |
| 5,526,348 | 6/1996 | Ichiyoshi | 370/57 |
| 5,550,813 | 8/1996 | Vella-Coleiro | 370/24 |
| 5,579,373 | 11/1996 | Jang | 379/59 |
| 5,602,847 | 2/1997 | Pagano et al. | 370/484 |
| 5,649,308 | 7/1997 | Andrews | 370/334 |
| 5,657,374 | 8/1997 | Russell et al. | 370/328 |
| 5,678,213 | 10/1997 | Myer | 455/209 |
| 5,691,666 | 11/1997 | Owen | 329/319 |
| 5,745,846 | 4/1998 | Myer et al. | 455/209 |
| 5,943,372 | 8/1999 | Gans et al. | 375/347 |
| 5,956,345 | 9/1999 | Allpress et al. | 370/480 |

*Primary Examiner*—Min Jung
*Assistant Examiner*—Enrique L Santiago
*Attorney, Agent, or Firm*—Brooks & Kushman

[57] ABSTRACT

CDMA (Code Division Multiple Access) communications systems and methods for performing a single to multiple frequency band conversion for mobile communications. The systems and methods include mixing a portion of a first CDMA signal in a first frequency band with a reference signal to convert a portion of the first CDMA signal to a second frequency band. The converted portion and the other portion of the first frequency band can then be transmitted. The systems and methods further include filtering a portion of a second CDMA signal having frequency components in multiple frequency bands to provide a filtered CDMA signal in the first frequency band. The filtered CDMA signal is then mixed to convert it to the second frequency band for receiver processing.

8 Claims, 4 Drawing Sheets

PCS FREQUENCY BANDS

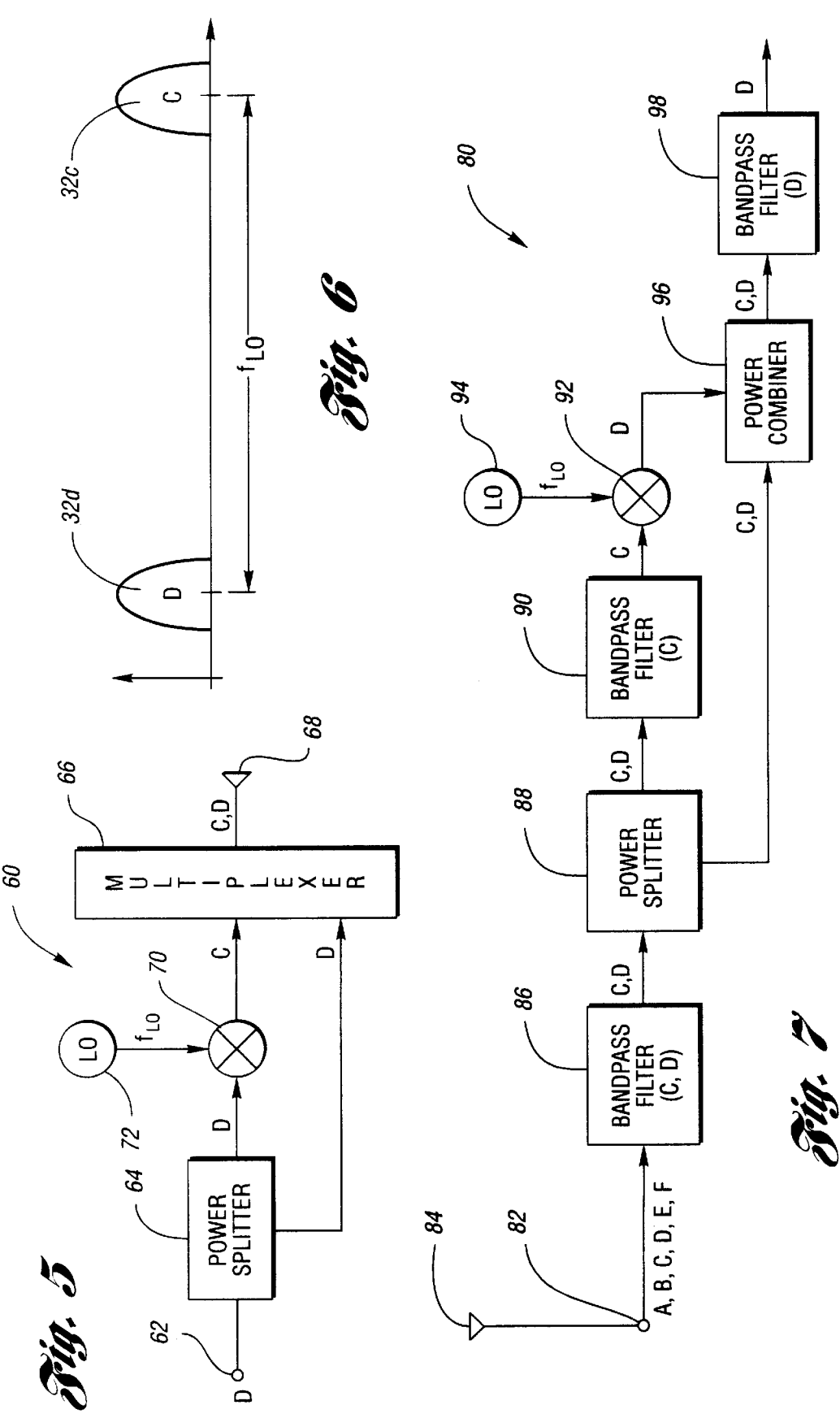

6,064,665

SYSTEM AND METHOD FOR SINGLE TO TWO-BAND PERSONAL COMMUNICATION SERVICE BASE STATION CONVERSION

TECHNICAL FIELD

The present invention relates to a CDMA (Code Division Multiple Access) communications methods and systems preferably applied to mobile communications.

BACKGROUND ART

An exemplary Personal Communication Service (PCS) system 20 is shown in FIG. 1. PCS system 20 includes wireless terminals 22, base stations 24, switches 26, and a fixed network such as a public switched telephone network (PSTN) 28. Each base station 24 serves many wireless terminals 22 simultaneously. Each switch 26 connects many base stations 24 to PSTN 28. Wireless terminals 22 and base stations 24 include transmitters and receivers to exchange radio frequency (RF) communication signals.

Code division multiple access (CDMA) is a class of modulation that uses specialized codes to provide multiple communication channels in a designated segment of the electromagnetic spectrum. With CDMA, there are no restrictions on when transmission may take place or what frequency may be used in an allocated channel. In short, there are no restrictions on time or bandwidth. Each transmitter may transmit whenever it wishes and can use any or all of the bandwidth allocated a particular channel. Adding additional code sequences simply degrades voice quality.

CDMA is referred to as spread-spectrum multiple access. Transmissions can spread throughout the entire allocated bandwidth spectrum. Transmissions are separated through envelope encryption/decryption techniques. That is, the transmissions are encoded with a unique binary word called a chip code. Each transmitter has a unique chip code. To receive a particular transmission, a receiver must know the chip code for the particular transmitter.

CDMA communication systems differ from analog systems in that multiple users share one carrier frequency in a frequency band simultaneously. There are multiple frequency bands in the electromagnetic spectrum available for the use of mobile communications. A problem exists, however, that frequency bands are a scare commodity. Consequently, the demand for frequency bands is greater than the supply. As a result, service providers of mobile communications obtain frequency bands as they become available. Typically, the acquired frequency bands are segregated from each other by other bands. A given provider is often granted two or more non-contiguous or segregated frequency bands. Furthermore, different providers typically have their own frequency bands.

In the past, to operate in a pair of segregated frequency bands, two sets of equipment dedicated to each frequency band was required. For instance, separate antennas, cables, and radio/signal processing hardware were required for each frequency band. What is needed is a system and method that would allow operation in multiple segregated frequency bands by one set of hardware.

SUMMARY OF THE INVENTION

Accordingly, it is an object of the present invention to provide a system and method for a single to multiple frequency band conversion for mobile communications.

It is another object of the present invention to provide a system and method for a single to two frequency band conversion for transmitting signals.

It is still another object of the present invention to provide a system and method for a two to single frequency band conversion for receiving signals.

In carrying out the above objects and other object, the present invention provides a CDMA (Code Division Multiple Access) communications method for converting a CDMA signal in a single frequency band to two frequency bands for transmission. The method includes splitting a CDMA signal into a first CDMA signal and a second CDMA signal. The first and the second CDMA signals are in a first frequency band. The first CDMA signal is then mixed with a reference signal having a predetermined frequency to convert the first CDMA signal from the first frequency band to a second frequency band. The first and the second CDMA signals are then transmitted.

Further, in carrying out the above objects and other objects, the present invention provides a CDMA communications method for converting a received CDMA signal having frequency components in at least two frequency bands to a single frequency band. The method includes passing only frequency components of a received CDMA signal within first and second frequency bands to provide a filtered two frequency band CDMA signal. The filtered two frequency band CDMA signal is then split into a first CDMA signal and a second CDMA signal.

Frequency components of the first CDMA signal within the first frequency band are then passed to provide a first frequency band CDMA signal. The first frequency band CDMA signal is then mixed with a reference signal having a predetermined frequency to convert the first frequency band CDMA signal from the first frequency band to the second frequency band to provide a second frequency band CDMA signal. The second frequency band CDMA signal is then combined with the second CDMA signal to provide a combined CDMA signal having frequency components in the first and second frequency bands. Frequency components of the combined CDMA signal within the second frequency band are then passed to provide a combined second frequency band CDMA signal.

Further, in carrying out the above objects and other objects, the present invention provides systems for carrying out the above described methods.

The advantages accruing to the present invention are numerous. For instance, the present invention drastically reduces the cost of required cell site equipment used to serve mobile communication users. The present invention allows a provider to operate in a certain frequency band while another provider operates in a different frequency band. The partners can share antennas, cables, and radio/signal processing hardware. Existing products require at least separate hardware for such a shared carrier application.

These and other features, aspects, and embodiments of the present invention will become better understood with regard to the following description, appended claims, and accompanying drawings.

BRIEF DESCRIPTION OF THE DRAWINGS

FIG. 5 illustrates a transmitter of a CDMA communication system according to the present invention;

FIG. 6 illustrates two frequency bands separated by a frequency $f_{LO}$;

FIG. 7 illustrates a receiver of a CDMA communication system according to the present invention.

BEST MODES FOR CARRYING OUT THE INVENTION

Figure 1:
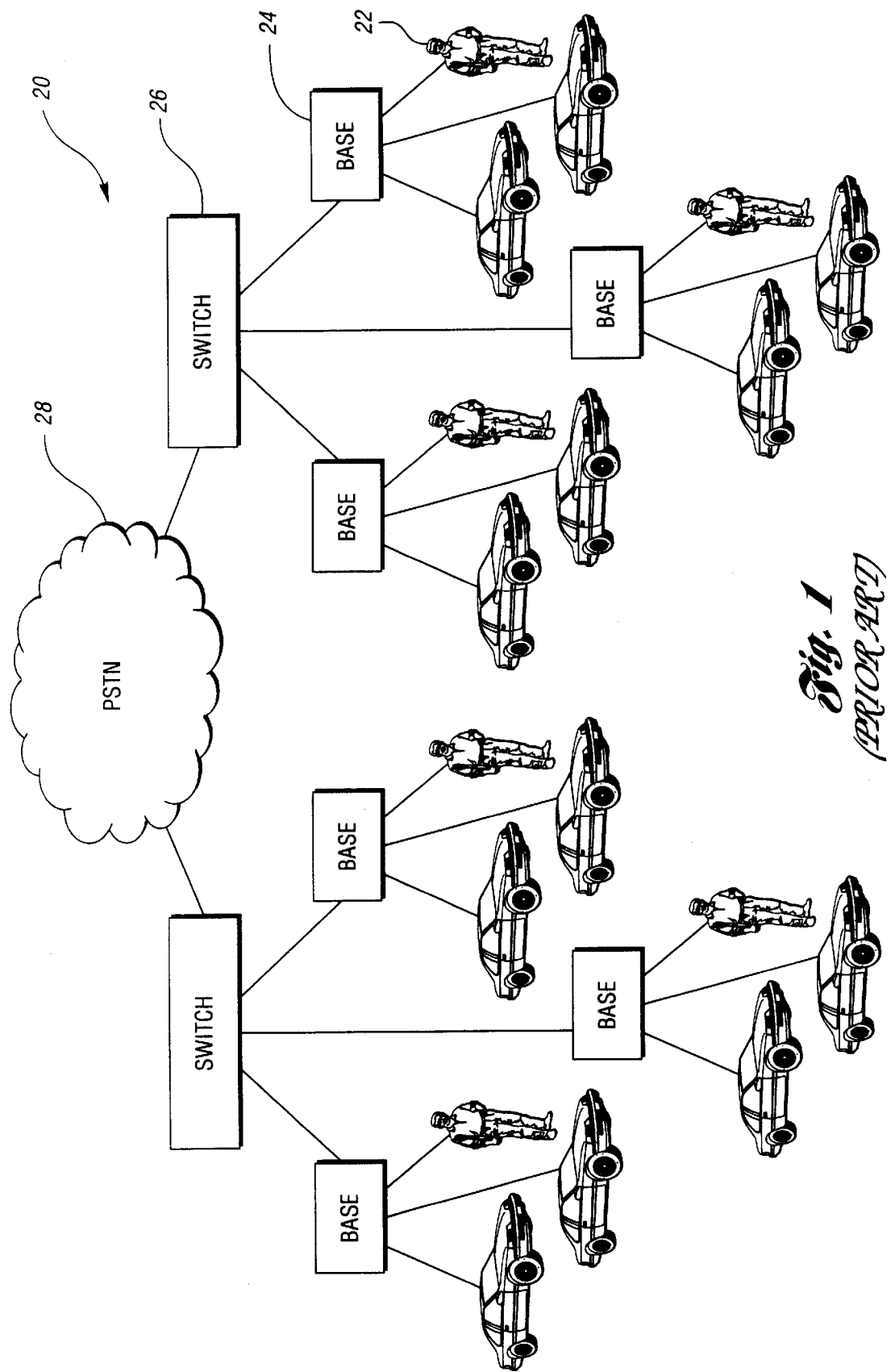
FIG. 1 illustrates an exemplary mobile communication Personal Communication Service (PCS) system.
Figure 2:
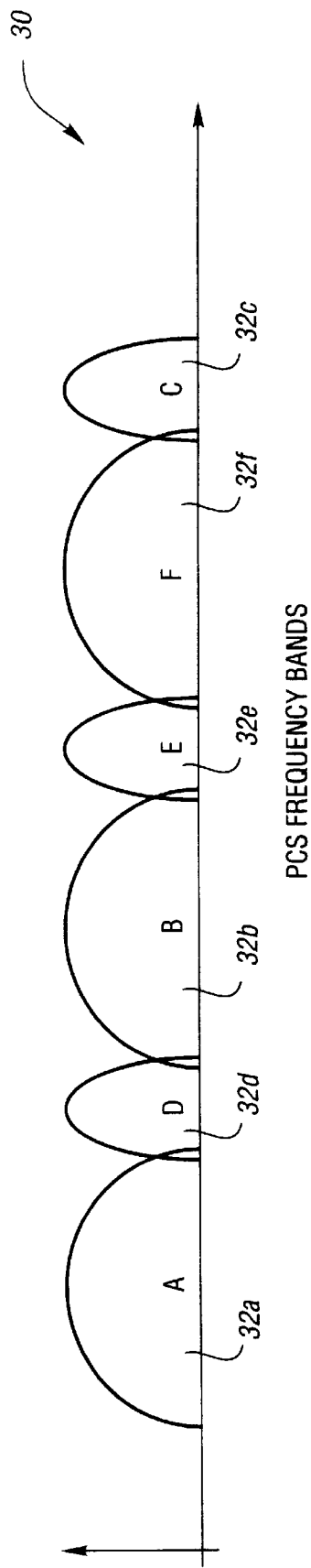
FIG. 2 illustrates frequency bands in a spectrum.

Referring now to FIG. 2, an electromagnetic spectrum 30 is shown. Spectrum 30 includes a plurality of frequency bands 32(a–f). Frequency bands 32(a–f) include: band A 32a, band B 32b, band C 32c, band D 32d, band E 32e, and band F 32f. Frequency bands 32(a–f) are arbitrarily segregated and adjacent as shown in FIG. 2. Each frequency band 32(a–f) is available for CDMA communications. Typically, one frequency band such as band 32a is used by one provider and another frequency band such as bands 32b or 32d is used by another provider. Frequency bands 32(a–f) are preferably in the 800–100 MHz range of the electromagnetic spectrum or in the range typically used for mobile communications. As an example, bands A, B, and F have a bandwidth of about 30 MHz and bands D, E, and C have a bandwidth of about 10 MHz.

Figure 3:
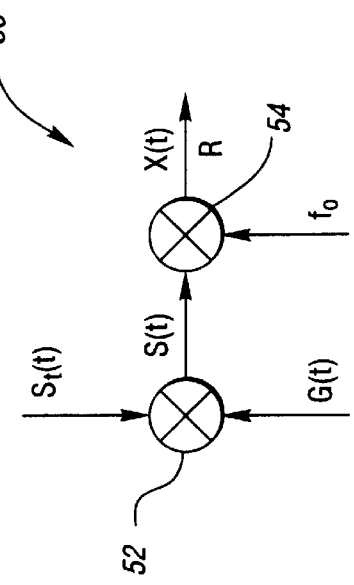
FIG. 3 illustrates an exemplary transmitter of a CDMA communications system.

Referring now to FIG. 3, an exemplary transmitter 40 of a CDMA communication system is shown. Transmitter 40 is connected to an antenna (not specifically shown) for transmission of data. In operation, the data x(t) transmitted with a data rate R is first modulated by a carrier $f_0$ at mixer 42 to form a signal S(t). The signal S(t) is then modulated at mixer 44 by a spreading code G(t) to form a direct sequence signal $S_r(t)$. The carrier $f_0$ is in the center of one of the available frequency bands 32(a–f). The direct sequence signal $S_r(t)$ is then transmitted by an antenna.

Figure 4:
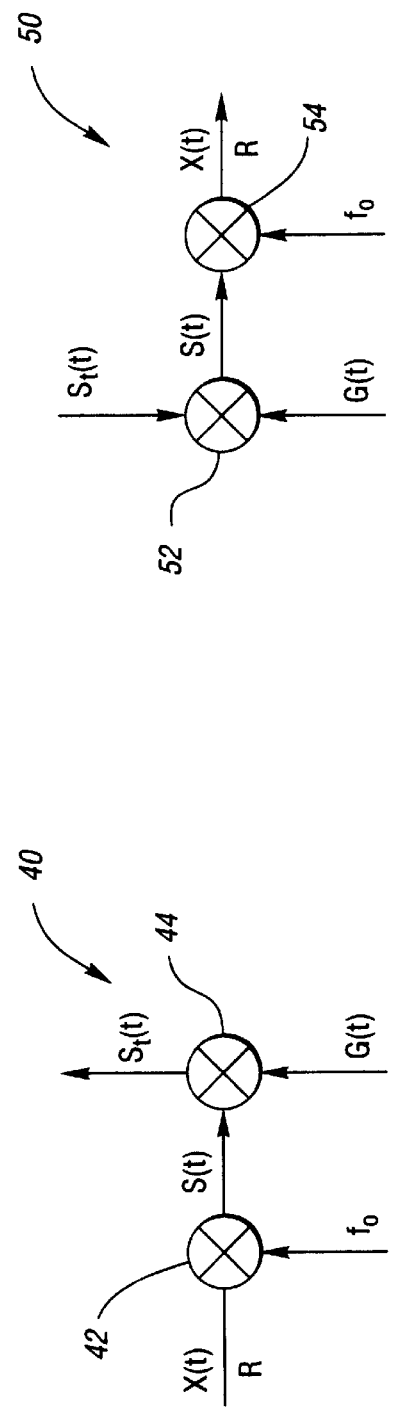
FIG. 4 illustrates an exemplary receiver of a CDMA communications system.

Referring now to FIG. 4, an exemplary receiver 50 for use with transmitter 40 shown in FIG. 3 is shown. Receiver 50 is connected to an antenna (not specifically shown) for reception of the direct sequence signal $S_r(t)$. In operation, the received $S_r(t)$ signal is correlated by a mixer 52 using the same spreading code G(t) to despread the signal $S_r(t)$. The despread signal S(t) is obtained and then demodulated by $f_0$ at a mixer 54 to recover the data x(t).

Referring now to FIG. 5, a transmitter 60 of a CDMA communication system according to the present invention is shown. Transmitter 60 is capable of enabling providers operating in different frequency bands to share antennas, cables, and radio/signal processing hardware for transmitting CDMA signals.

The operation of transmitter 60 for performing a single to two frequency band conversion of a CDMA signal will now be described. As an example, transmitter 60 converts a CDMA signal in band D 32d to a C and D band CDMA signal. Of course, other CDMA signals in different bands, such as bands A, B, E, and F, may be converted into other bands.

Initially, a CDMA signal in band D 32d is applied to input terminal 62 and then split by power splitter 64. A portion of the D band CDMA signal outputs power splitter 64 and then directly inputs a multiplexer 66 for subsequent transmission by an antenna 68.

Another portion of the D band CDMA signal outputs power splitter 64 and then inputs a mixer 70. Mixer 70 mixes the D band CDMA signal with a frequency $f_{LO}$ from a local oscillator (LO) 72 to form a C band CDMA signal. Specifically, mixer 70 uses $f_{LO}$ to convert the D band CDMA signal to a C band CDMA signal. The C band CDMA signal is then applied to multiplexer 66 such as a duplexer for subsequent transmission by antenna 68.

The conversion of the D band CDMA signal into the C band CDMA signal may either be an up or a down frequency conversion depending on where the bands are to each other in the spectrum. As shown in FIG. 6, the frequency $f_{LO}$ is approximately the difference in frequency between the center frequencies of the frequency bands 32(a–b). The conversion of frequency band D 32d into frequency band C 32c would be an up conversion as shown in FIG. 6.

Referring now to FIG. 7, a receiver 80 of a CDMA communication system according to the present invention is shown. Receiver 80 is capable of enabling providers operating in different frequency bands to share antennas, cables, and radio/signal processing hardware for receiving CDMA signals.

Initially, a received CDMA signal is applied to input terminal 82 from an antenna 84. The received CDMA signal may include different components in different frequency bands. For instance, the received CDMA signal may have frequency components in each of the A, B, C, D, E, and F frequency bands.

The received CDMA signal is then applied to a first bandpass filter 86. Bandpass filter 86 rejects all frequency components of the received CDMA signal not in the C and D frequency bands. Accordingly, bandpass filter 86 passes all frequency components of the received CDMA signal in the C and D frequency bands.

The filtered C and D band CDMA signal inputs power splitter 88. A portion of the C and D band CDMA signal inputs a second bandpass filter 90. Bandpass filter 90 rejects the frequency components of the C and D band CDMA signal in the D frequency band. Consequently, the frequency components in the C frequency band pass through bandpass filter 90.

The C band CDMA signal enters a mixer 92 after passing through bandpass filter 90. Mixer 92 mixes the C band CDMA signal with a frequency $f_{LO}$ from a local oscillator (LO) 94 to form a D band CDMA signal. Specifically, mixer 94 uses $f_{LO}$ to convert the C band CDMA signal to a D band CDMA signal. With reference to FIG. 6, the conversion of the C band CDMA signal to the D band CDMA signal is a down conversion.

The converted D band CDMA signal is then combined with the other portion of the C and D band CDMA signal from power splitter 88 in a power combiner 96. The combined C and D band CDMA signal is then filtered by a third bandpass filter 98. Bandpass filter 98 filters out the frequency components in the C band such that a D band CDMA signal outputs the bandpass filter. The D band CDMA signal may then be processed further by standard receiver equipment.

The operation of receiver 80 has been described with reference to converting a C and D band CDMA signal to a D band CDMA signal. Of course, like transmitter 60, receiver 80 may convert other CDMA signals in different bands into other bands.

Transmitter 60 and receiver 80 are incorporated in a base station between the antenna and transceiver circuitry. The advantage of the present invention is that the transceiver circuitry of the base station is unaware that signals in two different frequency bands are being transmitted and received. The transceiver circuitry only sees signals from one frequency band. Thus, transmitter 60 and receiver 80 may be added on to an existing base station and they are technology/vendor independent.

Figure 8:
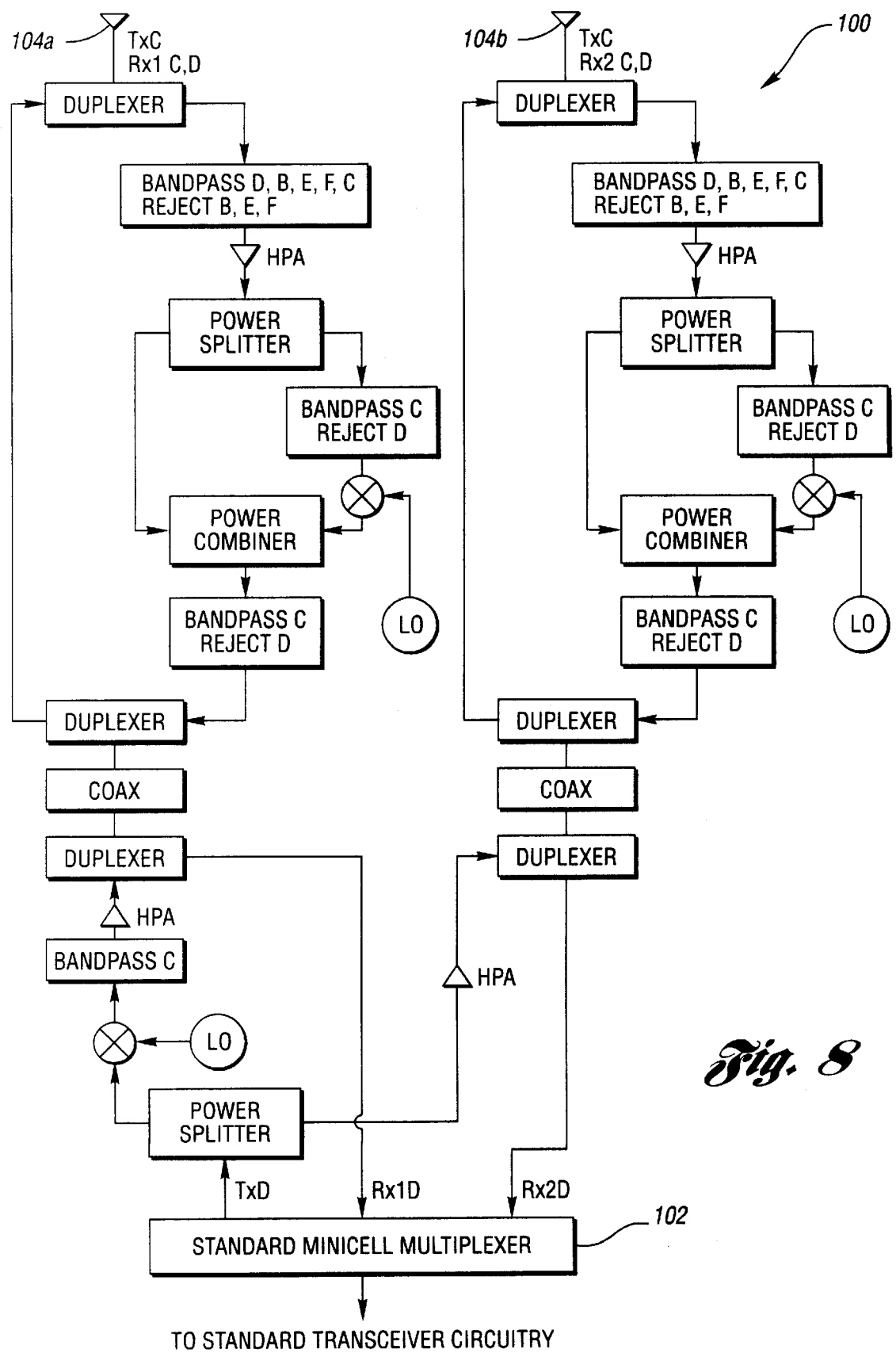
FIG. 8 illustrates an elaborate block diagram of a base station conversion unit according to the present invention.

Referring now to FIG. 8, a block diagram illustrating a two band (D and C), two cable standard minicell sector base station conversion unit 100 is shown. Base station conversion unit 100 includes equipment such as that shown in FIG. 6 for converting a single band frequency signal into a two band frequency signal for transmission. Similarly, base station conversion unit 100 includes equipment such as that shown in FIG. 8 for converting a received two band frequency signal into a single band frequency.

Conversion unit 100 includes a standard minicell multiplexer 102 for connection to standard transceiver circuitry (the connection is not specifically shown in FIG. 8). Similarly, conversion unit 100 includes a pair of antennas 104(a–b) for transmitting and receiving CDMA signals. Of course, only one antenna may be used with more advanced circuitry as known to those of ordinary skill in the art.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and scope of the appended claims.

For instance, while the embodiments have been described particularly in reference to non-contiguous frequency bands that are within standard PCS spectrums, the present invention is equally applicable to other non-contiguous frequency bands. A particular example is the mobile cellular spectrums. Although the cellular frequency bands are contiguous, a provider may share or own one or more bands with a common receiver to save on infrastructure costs. Another example of where the present invention can be used is within the Global Station Management (GSM) spectrum.

What is claimed is:

1. A CDMA (Code Division Multiple Access) communications apparatus for converting a CDMA signal in a single frequency band to two frequency bands for transmission, the apparatus comprising:

a signal splitter for splitting a CDMA signal into a first CDMA signal and a second CDMA signal, wherein the first and the second CDMA signals are in a first frequency band;

a mixer for mixing only the first CDMA signal with a reference signal having a predetermined frequency to convert the first CDMA signal from the first frequency band to a second frequency band; and an antenna operable with the signal splitter and the mixer for transmitting the first CDMA signal in the second frequency band and the second CDMA signal in the first frequency band.

2. The apparatus of claim 1 further comprising:

a local oscillator operable with the mixer for providing the reference signal.

3. The apparatus of claim 1 further comprising:

a duplexer interposed the mixer and the signal splitter and the antenna.

4. A CDMA (Code Division Multiple Access) communications apparatus for converting a received CDMA signal having frequency components in two frequency bands to a single frequency band, the apparatus comprising:

a first filtering circuit for passing only frequency components of a received CDMA signal within first and second frequency bands to provide a filtered two frequency band CDMA signal;

a signal splitter for splitting the filtered two frequency band CDMA signal into a first CDMA signal and a second CDMA signal;

a second filtering circuit for passing only frequency components of the first CDMA signal within the first frequency band to provide a first frequency band CDMA signal;

a mixer for mixing the first frequency band CDMA signal with a reference signal having a predetermined frequency to convert the first frequency band CDMA signal from the first frequency band to the second frequency band to provide a second frequency band CDMA signal;

a power combiner operable with the mixer and the power splitter for combining the second frequency band CDMA signal from the mixer with the second CDMA signal from the power splitter to provide a combined CDMA signal having frequency components in the first and second frequency bands; and a third filtering circuit for passing only frequency components of the combined CDMA signal within the second frequency band to provide a combined second frequency band CDMA signal.

5. The apparatus of claim 4 further comprising:

a local oscillator operable with the mixer for providing the reference signal.

6. The apparatus of claim 4 further comprising:

an antenna for providing the received CDMA signal to the first filtering circuit.

7. A CDMA (Code Division Multiple Access) communications method for converting a CDMA signal in a single frequency band to two frequency bands for transmission, the method comprising:

splitting a CDMA signal into a first CDMA signal and a second CDMA signal, wherein the first and the second CDMA signals are in a first frequency band;

mixing only the first CDMA signal with a reference signal having a predetermined frequency to convert the first CDMA signal from the first frequency band to a second frequency band; and transmitting the first CDMA signal in the second frequency band and the second CDMA signal in the first frequency band.

8. A CDMA (Code Division Multiple Access) communications method for converting a received CDMA signal having frequency components in at least two frequency bands to a single frequency band, the method comprising:

passing only frequency components of a received CDMA signal within first and second frequency bands to provide a filtered two frequency band CDMA signal;

splitting the filtered two frequency band CDMA signal into a first CDMA signal and a second CDMA signal;

passing only frequency components of the first CDMA signal within the first frequency band to provide a first frequency band CDMA signal;

mixing the first frequency band CDMA signal with a reference signal having a predetermined frequency to convert the first frequency band CDMA signal from the first frequency band to the second frequency band to provide a second frequency band CDMA signal;

combining the second frequency band CDMA signal with the second CDMA signal to provide a combined CDMA signal having frequency components in the first and second frequency bands; and passing only frequency components of the combined CDMA signal within the second frequency band to provide a combined second frequency band CDMA signal.

* * * * *